(12) United States Patent
Ohashi et al.

(10) Patent No.: US 7,470,333 B2
(45) Date of Patent: Dec. 30, 2008

(54) NON-ORIENTED ELECTRICAL STEEL SHEET EXCELLENT IN CORE LOSS AND MANUFACTURING METHOD THEREOF

(75) Inventors: Wataru Ohashi, Chiba (JP); Akihito Kiyose, Chiba (JP); Masafumi Miyazaki, Chiba (JP); Takeshi Kubota, Chiba (JP); Yousuke Kurosaki, Chiba (JP); Yoshihiro Arita, Fukuoka (JP); Ken-ichiro Miyamoto, Chiba (JP); Takashi Sawai, Chiba (JP)

(73) Assignee: Nippon Steel Corp., Tokyo (JP)

( * ) Notice: Subject to any disclaimer, the term of this patent is extended or adjusted under 35 U.S.C. 154(b) by 417 days.

(21) Appl. No.: 10/556,148

(22) PCT Filed: Apr. 28, 2004

(86) PCT No.: PCT/JP2004/006208

§ 371 (c)(1),
(2), (4) Date: Nov. 7, 2005

(87) PCT Pub. No.: WO2004/099457

PCT Pub. Date: Nov. 18, 2004

(65) Prior Publication Data

US 2006/0243351 A1    Nov. 2, 2006

(30) Foreign Application Priority Data

| May 6, 2003 | (JP) | 2003-128309 |
| Feb. 5, 2004 | (JP) | 2004-029386 |
| Apr. 26, 2004 | (JP) | 2004-130034 |

(51) Int. Cl.
*H01F 1/147* (2006.01)

(52) U.S. Cl. .................. 148/111; 148/306

(58) Field of Classification Search .......... None
See application file for complete search history.

(56) References Cited

U.S. PATENT DOCUMENTS

2002/0066500 A1    6/2002    Kawano et al.

FOREIGN PATENT DOCUMENTS

| JP | 5162115 | 11/1974 |
| JP | 54163720 | 6/1978 |
| JP | 55047320 | 4/1980 |
| JP | 56102550 | 8/1981 |

(Continued)

OTHER PUBLICATIONS

Written Opinion with English-language translation for International Application No. PCT/JP2004/006208.

(Continued)

*Primary Examiner*—John P. Sheehan
(74) *Attorney, Agent, or Firm*—Dorsey & Whitney LLP (57) ABSTRACT

A non-oriented electrical steel sheet is characterized in that the number density of inclusions with an equivalent volume diameter of less than 100 nm contained in the steel sheet is $1 \times 10^{10}$ [/mm$^3$] or less, and that the steel sheet contains, by mass %, C: up to 0.01%, Si: 0.1% to 7.0%. Al: 0.1% to 3.0%. Mn: 0.1% to 2.0%, REM: 0.0003% to 0.05%. Ti: up to 0.02%. S: up to 0.005%. and N: up to 0.005%. the balance Fe and inevitable impurities and the mass % of Al represented by [Al] and the mass % of Ti represented by [Ti] satisfy the equation $\log([Ti] \times [N]) - 1.19 \times \log([Al] \times [N]) + 1.84 > 0$ ... (1).

6 Claims, 5 Drawing Sheets

FOREIGN PATENT DOCUMENTS

| | | | |
|---|---|---|---|
| JP | 08003699 | | 1/1996 |
| JP | 9-67655 | * | 11/1997 |
| JP | 9-67656 | * | 11/1997 |
| JP | 10212556 | | 8/1998 |
| JP | 11158550 | | 6/1999 |
| JP | 2001 115242 | | 4/2001 |
| JP | 2001271147 | | 10/2001 |
| JP | 2002 220643 | | 8/2002 |
| JP | 2002-226953 | * | 8/2002 |
| JP | 2003119552 | | 4/2003 |
| JP | 2004-68084 | * | 3/2004 |
| WO | WO 2004/013365 | * | 12/2004 |

OTHER PUBLICATIONS

European Search Report dated Jul. 24, 2007 for the corresponding European application No. 04730094.2-2122.
Summary of Office Action from Korean Patent Office for Application No. 10-2005-7020335 dated Sep. 26, 2006.

* cited by examiner

NON-ORIENTED ELECTRICAL STEEL SHEET EXCELLENT IN CORE LOSS AND MANUFACTURING METHOD THEREOF

FIELD OF THE INVENTION

The present invention relates to a non-oriented electrical steel sheet used for a magnetic core of a motor or the like and a manufacturing method thereof, and more specifically, to a non-oriented electrical steel sheet excellent in core loss, especially in core loss after stress relief annealing.

BACKGROUND INFORMATION

A conventional non-oriented electrical steel sheet generally has a minimum core loss at a grain size of about 150 μm. Thus, a steel sheet of a better grain growth during finish annealing can be desired in view of the product property, simplified manufacturing process, and high productivity.

For example, a preferable grain size may be less than, for example, 40 μm when the steel sheet is subjected to punching for magnetic cores by customers because the accuracy in punching is better when the grain in the sheet is finer. As described above, preferences for core loss and the punching accuracy to the grain size may conflict with one another.

When these conflicting requirements are satisfied, a product sheet can be shipped with a small grain size and may be subjected to stress relief annealing, for example, at 750° C. for about two hours to grow the grains after punching by the user or consumers. Recently, the customers have had strong demands for materials with low core loss. In addition, there may be an increasing need for the product sheets which have a better grain growth during stress relief annealing since a reduction in the stress relief annealing time has been demanded because of improvement in productivity by the consumers.

One of major factors of inhibiting grain growth is the dispersion of fine inclusions in the steel. It is known that the grain growth is more inhibited with larger number and smaller size of the inclusions in the product.

In particular, as presented by Zener, the grain growth deteriorates further with a smaller r/f value that is represented by the equivalent volume radius r and the volume fraction f of inclusions in the steel. Accordingly, it is important not only to decrease the number, but also to increase the size of the inclusions for a good grain growth of the steel.

For preferable ranges of the size and number of inclusions in the non-oriented electrical steel, for example, Japanese Patent Application Laid-open No. 2001-271147, the entire disclosure of which is incorporated herein by reference, describes that inclusions with a size from 0.1 [μm] to 1 [μm] and inclusions with a size of greater than 1 [μm] are contained within a range from 5000 [/mm$^2$] to 10$^5$ [/mm$^2$] and a range of 500 [/mm$^2$] or less, respectively, per unit cross-section area.

For example, the number of inclusion per unit cross-section area can be converted to the number per unit volume. The above-indicated ranges can be converted to the range of 5×10$^6$ [/mm$^3$] to 1×10$^9$ [/mm$^3$] and the range of 5×10$^5$ [/mm$^3$] or less, respectively Inclusions inhibiting grain growth in a non-oriented electrical steel sheet are, e.g., oxides such as silica and alumina, sulfide such as manganese sulfide, and nitrides such as aluminum nitride and titanium nitride.

Highly purified molten steel generally provides a steel sheet free from these inclusions. There are several methods to reduce detrimental effects of the inclusions by adding various elements to the molten steel.

For oxides, a technological progress allows a removal of oxides from molten steel by adding a sufficient amount of Al, a strong deoxidizer, and stirring enough periods to float them up for removal.

For sulfides, in order to remove sulfur from molten steel thoroughly, the methods of adding of some rare earth metals as desulfurizer to fix sulfur in the steel is described in, for example, Japanese Patent Application Laid-open No. Sho 51-62115, Japanese Patent Application Laid-open No. Sho 56-102550, and Japanese Patent Publication No. 3037878, the entire disclosures of which are incorporated herein by reference. Further, for nitrides, the methods of adding boron that lead to the formation of coarse BN inclusion in the steel and the prevention of finer other inclusions are described in Japanese Patent Publication No. 1167896 and Japanese Patent Publication No. 1245901, the entire disclosures of which are incorporated herein by reference.

However, the high purification in the stage of molten steel may not be preferable because of unavoidable increased steelmaking cost. On the other hand, the above-described methods of adding elements are insufficient in improvement of grain growth and core loss in finish annealing or stress relief annealing after punching at lowered temperature and reduced period.

Even when the number density of inclusions is adjusted to fall within the recommended range described in Japanese Patent Application Laid-open No. 2001-271147, the grain growth would likely still be unimproved in some cases where the stress relief anneal is performed at a lower temperature and for a shorter period.

This may be because the size and the number density of inclusions adjusted based on the conventional knowledge are different from the composition, the size, and the number density of inclusions actually inhibiting grain growth as described herein below.

SUMMARY OF THE INVENTION

One of the objects of the present invention is to provide a non-oriented electrical steel sheet which provides large grain size enough to lower core loss and, e.g., to lower core loss even by annealing at a lower temperature and for a shorter period after punching.

According to one exemplary embodiment of the present invention, a non-oriented electrical steel sheet excellent in core loss is provided. For example, a number density of inclusions with an equivalent volume diameter of less than 100 nm contained in the steel sheet is 1×10$^{10}$ [/mm$^3$] or less.

According to another exemplary embodiment of the present invention, another non-oriented electrical steel sheet excellent in core loss is provided. For example, a number density of inclusions with an equivalent volume diameter of less than 50 nm contained in the steel sheet is 2.5×10$^9$ [/mm$^3$] or less.

The steel sheet may contain, by mass %, C: up to 0.01%, Si: 0.1% to 7.0%, Al: 0.1% to 3.0%, Mn: 0.1% to 2.0%, REM: 0.0003% to 0.05%, Ti: up to 0.02% or less, S: up to 0.005%, and N: up to 0.005%, the balance Fe and inevitable impurities, and that the mass % of Al, the mass % of N and the mass % of Ti can satisfy the following equation:

$$\log([Ti]\times[N]) - 1.19\times\log([Al]\times[N]) + 1.84 > 0$$

The steel sheet may further contain, by mass %, one or more of P: up to 0.1%, Cu: up to 0.5%, Ca or Mg: up to 0.05%, Cr: up to 20%, Ni: up to 1.0%, a total of one or two of Sn and Sb: up to 0.3%, Zr: up to 0.01%, V: up to 0.01%, O: up to 0.005%, and B: up to 0.005%.

According to yet another exemplary embodiment of the present invention, a method for manufacturing a non-oriented electrical steel sheet excellent in core loss can be provided. In particular, a steel may be maintained within a temperature range of 1200° C. to 1300° C. for one minute or more. Fir example, the steel may contain, by mass %, C: up to 0.01%, Si: 0.1% to 7.0%, Al: 0.1% to 3.0%, Mn: 0.1% to 2.0%, REM: 0.0003% to 0.05%, Ti: up to 0.02%, S: up to 0.005%, and N: up to 0.005%, the balance Fe and inevitable impurities. The mass % of Al represented by [Al], the mass % of N and the mass % of Ti represented by [Ti] can be provided as follows:

$$\log([Ti]\times[N])-1.19\times\log([Al]\times[N])+1.84>0$$

The steel may further contain, by mass %, one or more of P: up to 0.1%, Cu: up to 0.5%, Ca or Mg: up to 0.05%, Cr: up to 20%, Ni: up to 1.0%, a total of one or two of Sn and Sb: up to 0.3%, Zr: up to 0.01%, V: up to 0.01%, O: up to 0.005%, and B: up to 0.005%.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figure showing illustrative embodiments, results and/or features of the exemplary embodiment(s) of the present invention, in which.

DETAILED DESCRIPTION

The magnetic property of a non-oriented electrical steel sheet is generally affected by fine inclusions contained in the steel sheet and newly found appropriate ranges of the size and the number density of inclusions to provide an excellent magnetic property and a punching property.

The effects exerted on the magnetic property by the size and the number density of inclusions will be described using the steels shown below. The steel portions shown in the drawings of the present application are merely exemplary in nature, and in no way limit the present invention.

For example, certain steel portions that contain C, Si, Al, Mn, REM, Ti, S, N and the balance Fe with inevitable impurities were continuously cast and hot-rolled, and the hot rolled sheets were subjected to hot band annealing, cold rolling into a thickness of 0.5 mm and finish annealing at 850° C. for 30 seconds. The steel sheet can be further coated with an insulative coating, and the product sheets may be subjected to stress relief annealing at 750° C. for approximately 1.5 hours.

Further, the number density of inclusions, grain size and core loss of the product sheets after the stress relief anneal can be evaluated. The exemplary results are shown in Table 1 and FIGS. 1 and 2.

Figure 1:
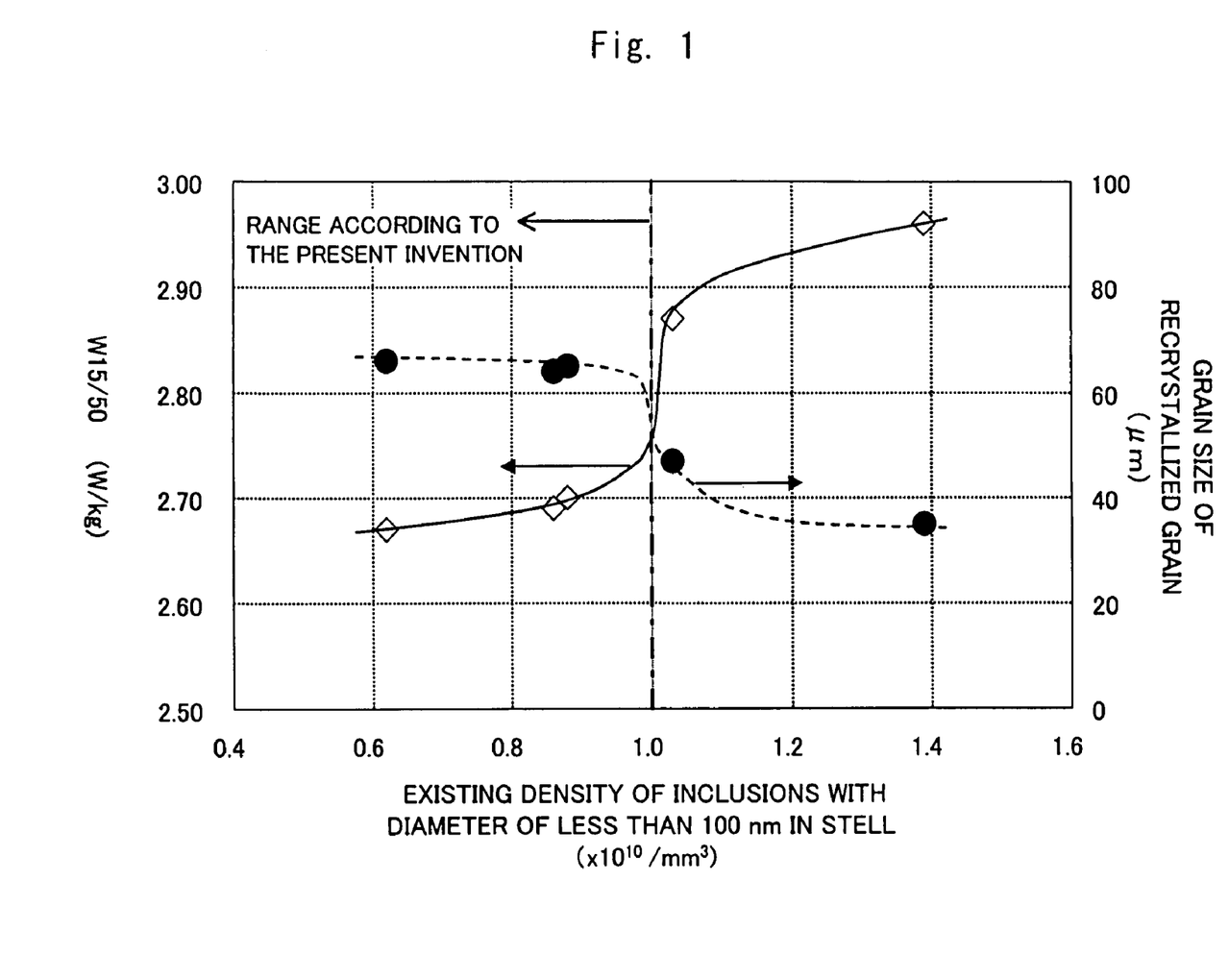
FIG. 1 is a graph showing an exemplary relation between the number density of inclusions with a size of less than 100 nm and the grain size and core loss value after annealing according to one exemplary embodiment of the present invention.

As shown in Table 1 and FIG. 1, there is a correlation between the grain size and core loss after the anneal and the number density (e.g., the number per 1 mm3) of inclusions with an equivalent volume diameter (e.g., the equivalent volume diameter of inclusions relating to the present invention will be referred to as "inclusion size" or just "size") of less than 100 nm, and the grain growth and core loss is likely excellent when the number density of inclusions is $1\times10^{10}$ [/mm$^3$] or less.

Figure 2:
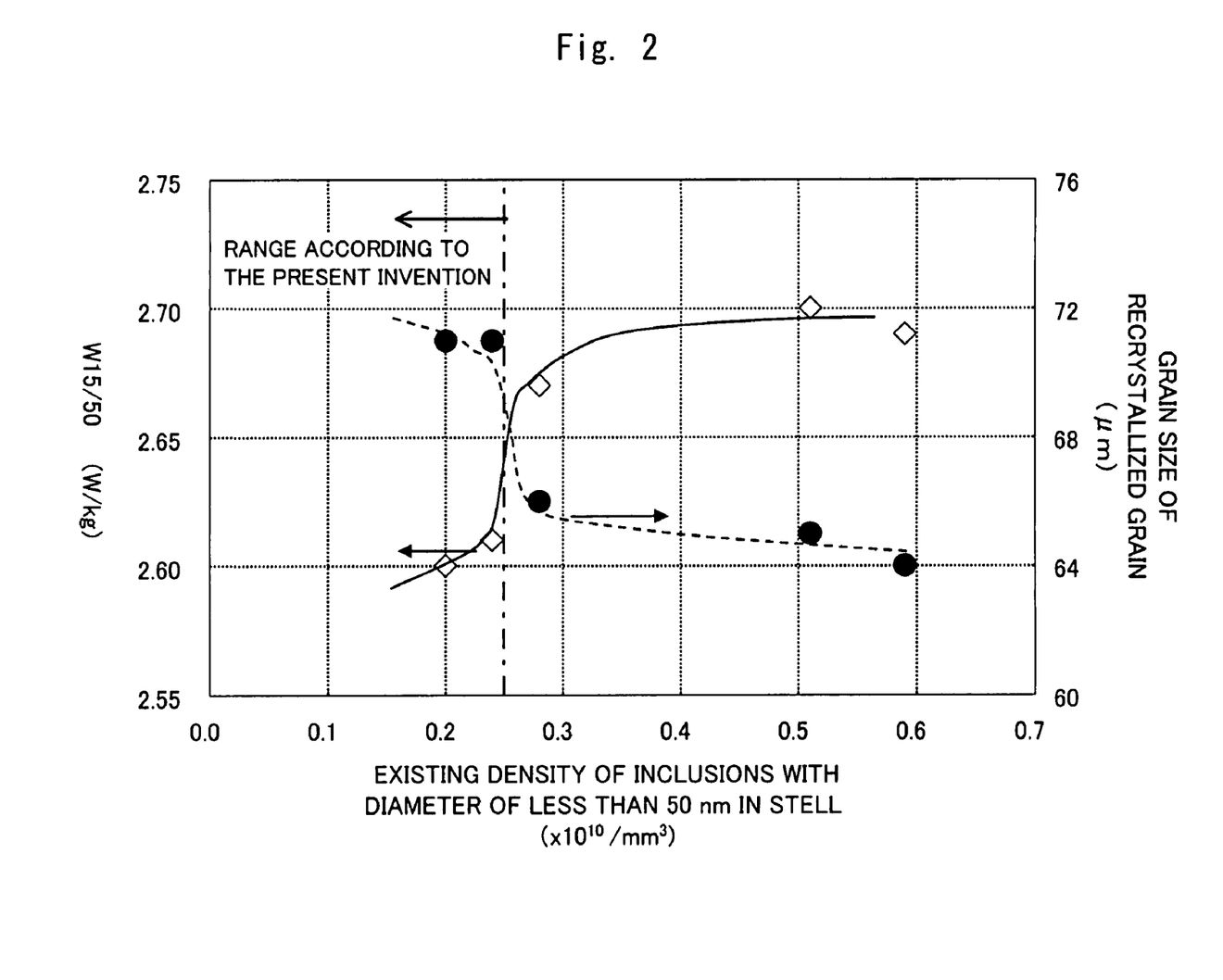
FIG. 2 is a graph showing an exemplary relation between the number density of inclusions with a size of less than 50 nm and the grain size and core loss value after annealing according to another exemplary embodiment of the present invention.

Further, as shown in FIG. 2, when the number density of inclusions with a size of less than 50 nm is $2.5\times10^9$ [/mm$^3$] or less, the magnetic properties are likely remarkably excellent.

On the other hand, when the number density of inclusions with a size of 100 nm or greater is $1\times10^9$ [/mm$^3$] or less but the number density of inclusions with a size of less than 100 nm is greater than $1\times10^{10}$ [/mm$^3$], the magnetic properties may be less desirable.

For example, many inclusions less than 100 nm may be detected also in the samples whose inclusions with a size of 0.1 μm (=100 nm) or greater are $1\times10^9$ [/mm$^3$] or less. Thus, it can be determined that fine inclusions with a size of less than 100 nm, particularly a size of less than 50 nm are, e.g., a major factor of grain growth inhibition which leads to deteriorate core loss.

The above results are for the case where stress relief annealing may be performed at 750° C. for 1.5 hours, a period shorter than typical stress relief annealing condition, at 750° C. for 2 hours. If the stress relief anneal is performed in a typical condition, the difference of grain growths and core losses among samples described above can be clearer because the difference of the pinning effect of fine inclusions becomes larger in such condition.

Thus, the desirable product properties may not be readily obtained by only specifying the number density of inclusions with a size of 100 nm or greater referred to conventionally. Further, the preferable magnetic properties of the product in accordance with one exemplary embodiment of the present invention can be obtained by specifying the number density of inclusions with a size of less than 100 nm, and that more preferable properties can be obtained by specifying the number density of inclusions with a size of less than 50 nm.

The exemplary excellent properties of the steel portions in accordance with an exemplary embodiment of the present invention can be exhibited if the size and the number density of inclusions in a steel sheet are satisfied, e.g., regardless of compositions of the steel particularly.

The exemplary embodiment of the method according to the present can be performed for the above-described evaluation. For example, a product sheet used for a sample may be polished to an appropriate thickness from its surface to make a mirror surface and subjected to etching described below, and thereafter its replica can be taken so that inclusions transferred to the replica may be observed under a field emission-type transmission electron microscope. In such case, instead of a replica, a thin film may be prepared for observation.

The size and the number density of inclusions can be measured for many or all of the inclusions within a certain observation area. The composition of the inclusions may be determined by an energy dispersive X-ray analyzer and diffraction pattern analysis.

For the smallest size of the inclusions, e.g., there may be no inclusion smaller than the lattice constant of the inclusion which is about several angstroms. The lowest limit of the size of the stably existing inclusion nuclear can be about 5 nm. Therefore, any method (for example, magnification) capable of observing the inclusion having a size at that level can be suitable for the observation.

An exemplary etching method can be employed which was proposed by Kurosawa et al (Fumio Kurosawa, Isao Taguchi, and Ryutaro Matsumoto: Journal of The Japan Institute of Metals, 43 (1979), p. 1068), the entire disclosure of which is incorporated herein by reference. Using such exemplary method, the samples may be subjected to electrolyte etching in a non-aqueous solvent to dissolve only the steels with inclusions being left, thereby the inclusions can be filtrated.

The evaluation results of the compositions of fine inclusions in the above-described exemplary product steels containing Ti by the aforementioned method can indicate that the major inclusions (50% or more in the number of pieces) with a size of less than 100 nm are Ti compounds such as TiN, TiS, or TiC.

In an electrical steel, the starting temperatures of formation of TiN, TiS, and TiC can fall within 1200 to 1300° C., 1000 to 1100° C., and 700 to 800° C., respectively. For example, TiN precipitates during cooling process after casting of a slab or the like, while TiS and TiC precipitate during the process but melt again at the heating temperature in a normal hot-rolling step and re-precipitates during cooling thereafter.

In the latter case, since the diffusivity of Ti in the steel at around the starting temperature of the Ti precipitations is lower than that of other metal elements, the Ti compounds may not sufficiently grow compared to other inclusions. As a result, the size of the Ti compound may not be 100 nm or greater, but is less than 100 nm, or less than 50 nm in some cases, resulting in fine Ti compound.

The number density of inclusions increases as the inclusion size becomes smaller and accordingly the grain growth can be inhibited more strongly. However, the major inclusions which strongly inhibit grain growth in the electrical steel can be fine inclusions with a size of less than 100 nm, therefore limiting the number density of the inclusions remarkably improves the grain growth and consequently core loss, and that the most of the inclusions with a size of less than 100 nm are Ti compounds such as, for example, TiN, TiS, or TiC.

It is generally difficult to prevent a contamination of a small amount of Ti in the steel manufacturing process. Since steels containing a considerable amount of Ti are also produced besides the electrical steel in a normal steelmaking process, Ti may inevitably contaminate into the steel from steel, slag or like adhering to a refractory.

Even in the manufacturing process of only electrical steel Ti may come into the steel from, for example, a ferrosilicon alloy used for adjusting Si composition in the steel, and/or from a reduced slag containing Ti oxide.

Although it has been commonly known that a small amount of Ti inevitably contaminated in steel inhibits grain growth, a non-oriented electrical steel sheet with better grain growth can be obtained by controlling the amount of Ti in the steel within a preferable range, by allowing inevitably contaminated Ti or even by intentional addition of Ti, according to an exemplary embodiment of the present invention.

The effects of steel composition on the inclusions are described below. For example, to render the detrimental effects of TiS among Ti compounds, a technique using REM (as described herein below), decreasing sulfide-based inclusions by fixing S by addition of REM has been used.

Hereinafter, the term of "REM" refers to, e.g., 17 elements, in total, including 15 elements of lanthanum with an atomic number of 57 to lutetium with an atomic number of 71, and scandium with an atomic number of 21 and yttrium with an atomic number of 39.

It has been determined according to an exemplary embodiment of the present invention that Ti in the steel can be free from detrimental effects if Ti is within an appropriate composition range where REM oxysulfide or REM sulfide allow restraint of fine sulfides by fixation of sulfur in the steel as TiS. Furthermore fine TiN can be restrained by compositely precipitating and growing of TiN on a surface of REM oxysulfides or REM sulfides, as described below.

The starting temperatures of precipitation of TiN and AlN are close to each other in the electrical steel. Since Al is overwhelmingly superior in amount, if the starting temperature of precipitation of AlN is higher than that of TiN even slightly, N in the steel preferentially bonds with Al and is thereby consumed for precipitation of AlN, while Ti, which is less in amount than Al, has remarkably less opportunity to bond with N.

Because of shortage of the amount of N, fine dispersed TiN in the steel can be caused by a deprived chance of nucleation and growing of TiN on a surface of REM oxysulfide or REM sulfide.

Accordingly, the requirement affecting the precipitation of fine TiN is the precipitation temperature of TiN exceeding that of AlN which can be determined by a solubility product.

For example, the temperatures of production of TiN and AlN correlate to [Ti]×[N] and [Al]×[N], respectively, where [Ti] represents the mass % of Ti, [N] represents the mass % of N, and [Al] represents the mass % of Al.

According to an exemplary embodiment of the present invention, it has been determined that when the REM amount falls within a range of 0.0003 to 0.05 mass % and the components satisfy the following equation (1), Ti is scavenged as TiN by REM oxysulfide or REM sulfide, resulting in restraint in precipitation of finely dispersed TiN.

$$\log([Ti]\times[N])-1.19\times\log([Al]\times[N])+1.84>0 \quad (1)$$

Consequently, the number density of inclusions with an equivalent volume diameter of less than 100 nm contained in the steel sheet can be $1\times10^{10}$ [/mm$^3$] or less, or the number density of inclusions with an equivalent volume diameter of less than 50 nm contained in the steel sheet can be $2.5\times10^9$ [/mm$^3$] or less. Therefore, a non-oriented electrical steel sheet can be provided in which the grain growth is better in typical used annealing condition and thereby the annealing time can be shortened. In particular, an excellent core loss can be obtained in the stress relief anneal at a lower temperature for a shorter period. Further low core loss can be attained by annealing at conventional general stress relief annealing conditions, 750° C. for 2 hours.

The effects and other features of the present invention will be described in detail below with reference to, e.g., Table 2.

For example, in Table 2, No. 11 is referred to a steel containing, by mass %, C: 0.0024%, Si: 2.1%, Al: 0.32%, Mn: 0.2%, S: 0.0025%, Ti: 0.0016%, N: 0.0019%, and REM: 0.0045%.

No. 12 to No .20 were steels containing, by mass %, C: 0.0024%, Si: 2.1%, Mn: 0.2%, S: 0.0025%, P: 0.02%, Cu: 0.01%, and various amounts of Al, Ti, N, and REM as shown in Table 2.

These exemplary steels were subjected to continuous casting, hot rolling, hot-rolled sheet annealing, cold rolling to a thickness of 0.50 mm, finish annealing at 850° C. for 30 seconds, and coated with an insulative coating. The grain size of any of the product sheets was within a range of 30 to 33 μm.

Such product sheets were then subjected to stress relief annealing at 750° C. for 1.5 hours, a shorter time than usual. Thereafter, the grain sizes and the magnetic properties were evaluated. The results are shown in, e.g., Table 2 and FIGS. 3 and 4.

As provided in Nos. 11 to 14 of Table 2, when the compositions of the samples were appropriate and the amounts of inclusions were within the range according to the present invention, the grain sizes after the stress relief annealing ranged from 67 to 71 μm and the magnetic properties (core loss: W15/50) were excellent such as 2.7 [W/kg] or less because of the good grain growth.

As a result of evaluation of the size by the above-described exemplary method according to the present invention, the number density, and the composition of inclusions in the product sheets, it was shown that $0.6\times10^{10}$ [/mm$^3$] of MnS with a size of less than 100 nm existed in No. 11, and $0.3\times10^{10}$ to $0.5\times10^{10}$ [/mm$^3$] of $Cu_2S$ with a size of less than 100 nm existed in Nos. 12 to 14, so the number densities of inclusions were $1.0\times10^{10}$ [/mm$^3$] or less in the samples. Further, REM oxysulfide or REM sulfide with a size of 0.2 [μm] to 2.0 [μm] existed in the product sheets.

Figure 3:
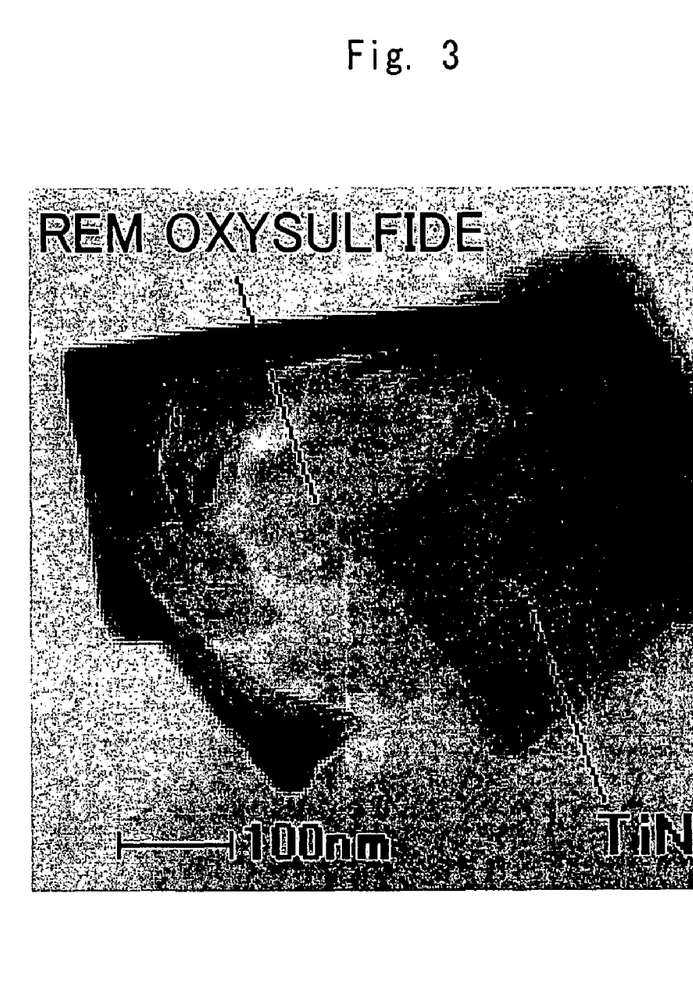
FIG. 3 is an exemplary illustration of composite TiN inclusions around REM oxysulfide according to an exemplary embodiment of the present invention.

An example of REM oxysulfide is shown in FIG. 3. As shown in FIG. 3, e.g., TiN compositely precipitated around the inclusions containing REM and became large.

As described above, REM in the steel forms REM oxysulfide or REM sulfide fixing S resulting in hindering or suppressing fine sulfide formation, and that TiN with a size of greater than several tens nm compositely precipitated on REM oxysulfide or REM sulfide scavenges Ti, whereby formation of fine inclusions containing Ti is prevented.

As provided in No. 15 of Table 2, although the REM amount was within a range of 0.0003 to 0.05 mass %, the Ti amount exceeded 0.02 mass %. Thus, $2.5\times10^{10}$ [/mm$^3$] of TiS with a size of less than 100 nm existed in this exemplary product sheet, thereby inhibiting grain growth and, as a result, the grain size after stress relief annealing remained approximately 35 [μm] and the W15/50 value was approximately 3.06 [W/kg].

In this case, TiN adhered to REM oxysulfide or REM sulfide was observed as the inclusion with a size of greater than 100 nm. Therefore, the scavenge effect of Ti was exerted as described above. However the Ti could not completely be scavenged by REM oxysulfide or REM sulfide because there was excessive Ti, resulting in Ti remaining in the steel. It can be considered that a considerable amount of TiC precipitated from such un-scavenged Ti in the steel in the temperature history after the hot-rolling step. Consequently, the upper limit of the Ti amount can preferably be 0.02 mass %.

In each of Nos. 16 to 18 of Table 2, the REM amount was within a range of 0.0003 to 0.05 mass %, and the Ti amount was 0.02 mass % or less, but the composition were out of the ranges defined by the evaluation equation (1), and therefore AlN was observed as inclusions with a size of greater than 100 nm in each of the exemplary product sheets.

Further, 1.6 to $1.8\times10^{10}$ [/mm$^3$] of TiN with a size of less than 100 nm was in exist Accordingly, the grain sizes after stress relief annealing remained between approximately 38 [μm] and 41 [μm], and the W15/50 were between approximately 2.76 [W/kg] and 2.83 [W/kg].

Figure 4:
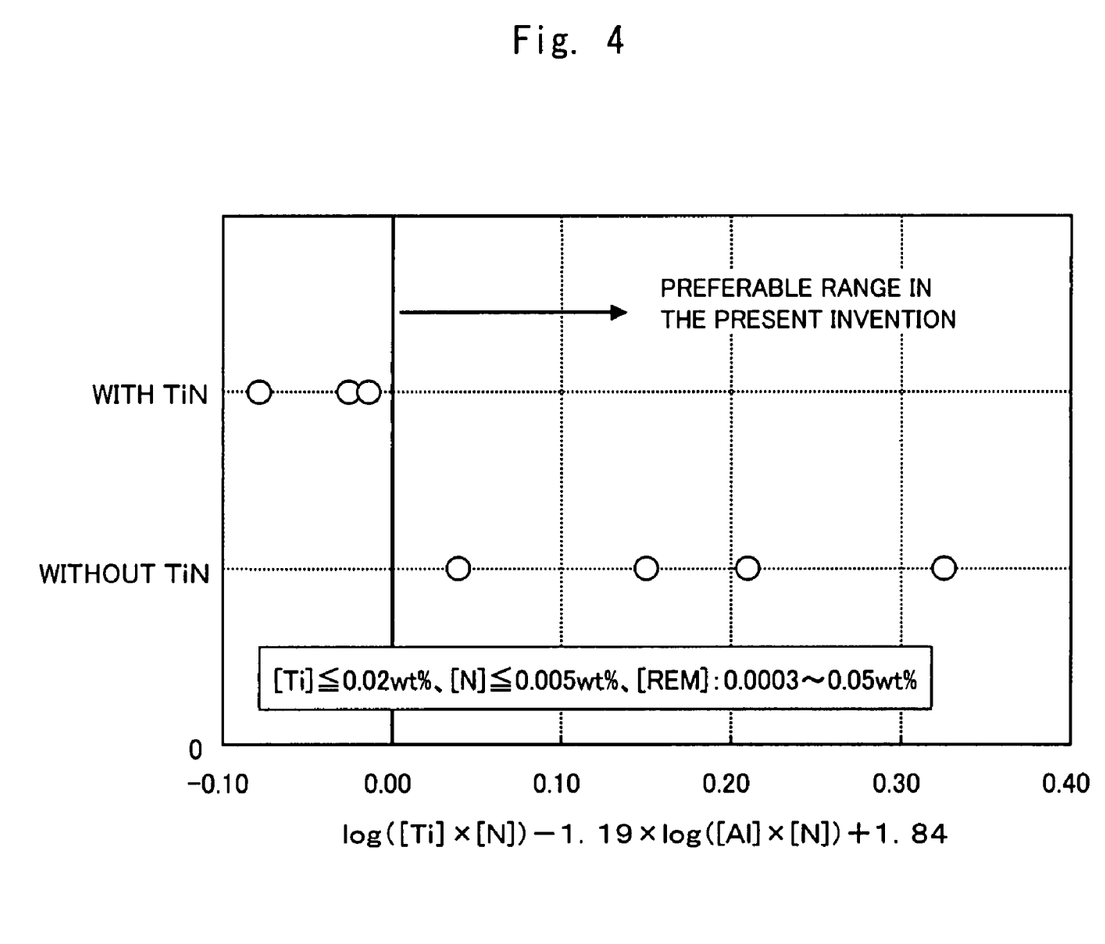
FIG. 4 is a graph showing an exemplary relation between the index obtained by a predetermined technique and presence or absence of fine TiN according to still another exemplary embodiment of the present invention.

Further, the relation between the value on the left side of the equation (1) and the presence or absence of fine TiN less than 100 nm is shown in FIG. 4. As provided in FIG. 4, the formation of fine TiN can be suppressed when the equation (1) is satisfied.

Figure 5:
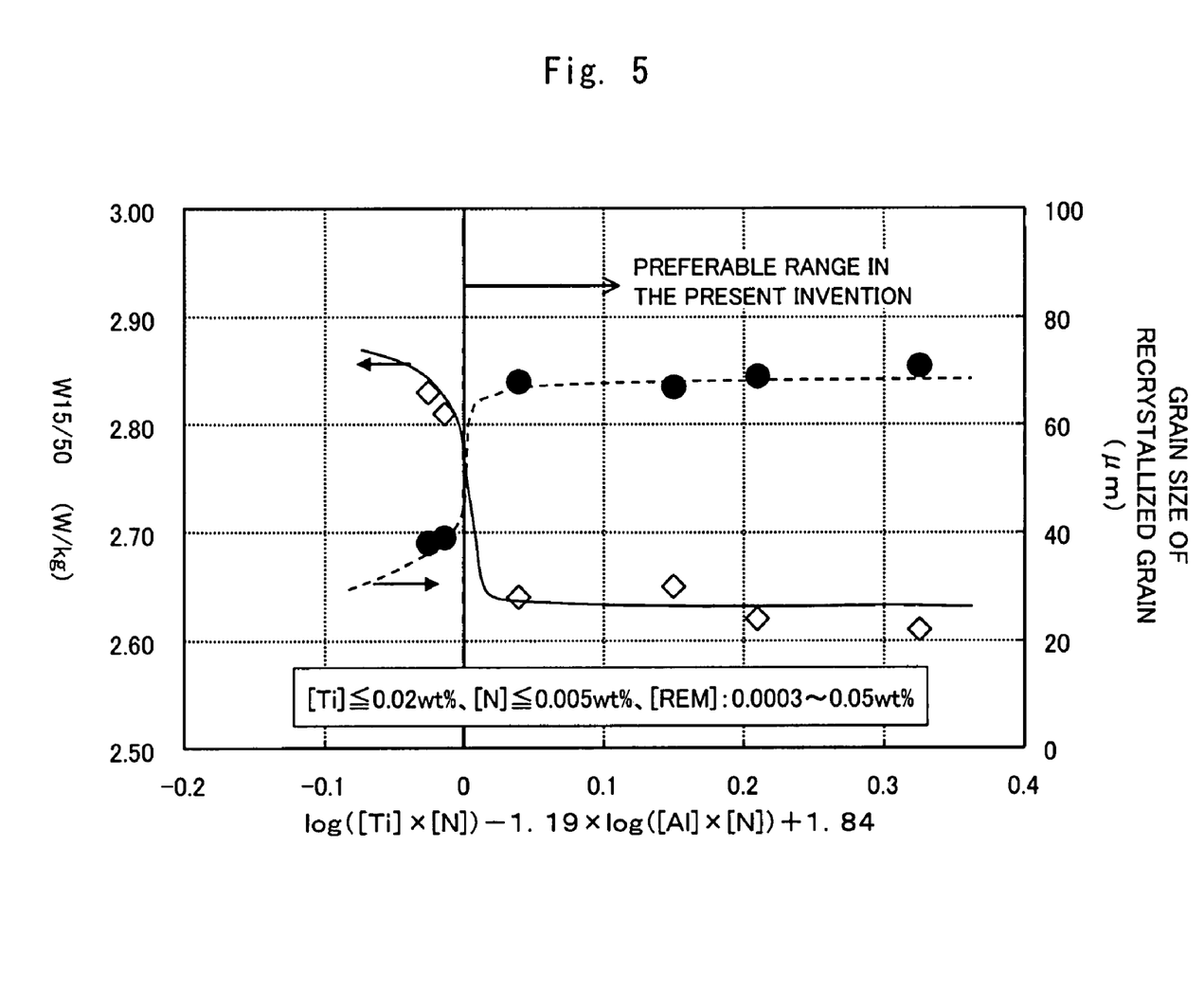
FIG. 5 is a graph showing an exemplary relation between the index obtained by the predetermined technique and the grain size and core loss value after annealing according to yet another exemplary embodiment of the present invention.

Further, the relation between the value on the left side of the equation (1) and the grain size and the core loss after annealing is shown in the exemplary graph of FIG. 5. As provided in FIG. 5, the grain growth can be good, and the core loss may be excellent when the equation (1) is satisfied.

For example, when the Ti amount is small as shown in Nos. 17 and 18 of Table 2, fine TiN precipitates by contrast. This can be because when Ti is deficient, AlN preferably precipitates as is also indicated by the equation (1).

It is know that the Ti amount should be preferably as small as possible, and therefore contamination of Ti into the steel can be intensively prevented. However, according to an exemplary embodiment of the present invention, such large amount of labor for decreasing Ti is not necessary. For example, it is preferable to make the Ti amount in the steel possibly larger than the Ti amount inevitably contaminated therein, by adding Ti. This can cause TiN to compositely precipitate on REM oxysulfide or REM sulfide and to be scavenged from the steel, so that TiN does not re-melt and finely reprecipitate alone in the thermal history after hot rolling. This can result in an increased flexibility to set the hot-rolling schedule as well as possibility to obtain an excellent product property. In particular, to obtain an electrical steel with good grain growth and excellent core loss property, according to an exemplary embodiment of the present invention, the Ti amount can be less restricted or controlled to fall within the above-described preferable range.

Further, on the condition that the starting temperature of precipitation of TiN surely exceeds the starting temperature of precipitation of AlN, the formation of fine TiN can be stably suppressed. The difference in starting temperature of formation of TiN and AlN may be about 10° C. or higher.

The condition to achieve the difference is that the contents of Ti, N, and Al can satisfy the following equation (2).

$$\log([Ti]\times[N])-1.19\times\log([Al]\times[N])+1.70>0 \quad (2)$$

In particular, [Ti] represents the mass % of Ti, [N] represents the mass % of N, and [Al] represent the mass % of Al.

The difference of more than about 15° C. in the precipitation starting temperature between TiN and AlN can be more preferable because the precipitation starting temperature of TiN more surely exceeds that of AlN so that the formation of fine TiN can be suppressed more stably.

The condition to achieve the difference can be obtained with the contents of Ti, N, and Al satisfying the following equation (3).

$$\log([Ti]\times[N])-1.19\times\log([Al]\times[N])+1.58>0 \quad (3)$$

Again, [Ti] represents the mass % of Ti, [N] represents the mass % of N, and [Al] represent the mass % of Al.

Further, the difference of more than about 20° C. in the precipitation starting temperature between TiN and AlN can be further preferable because the precipitation starting temperature of TiN further surely exceeds that of AlN so that the formation of fine TiN can be suppressed further stably.

The condition to achieve the difference can be obtained with the contents of Ti, N, and Al satisfying the following equation (4).

$$\log([Ti]\times[N])-1.19\times\log([Al]\times[N])+1.49>0 \quad (4)$$

The present inventors have also found that the contents of Ti, N, and Al more preferably satisfy the following equation (5).

$$\log([Ti]\times[N])-1.19\times\log([Al]\times[N])+1.35>0 \quad (5)$$

For example, no REM was added in No. 19 of Table 2, while the REM amount was 0.0002 mass % in No. 20 of Table 2, both of which were less than 0.0003 mass % resulting in $2.3 \times 10^{10}$ to $2.9 \times 10^{10}$ [/mm$^3$] of fine TiS existed as a result of evaluation of inclusions in the steel sheets by the above-described method showing that fixation of S by REM was insufficient in these cases.

The grain sizes after annealing remained between approximately 33 [μm] and 36 [μm], and the W15/50 value was approximately 3.0 [W/kg].

The above exemplary results were for the case where the stress relief annealing was performed for a shorter period than that of the typically performed stress relief annealing. When conventional stress relief annealing is applied, a difference of grain growth due to pinning effect by fine inclusions can become more prominent.

below, certain reasons for limitation of preferable contents for the composition of components in exemplary embodiments of the present invention are described.

[C]: C has detrimental effects on a magnetic property, and magnetic aging becomes remarkable due to precipitation of C, so its upper limit is set to 0.01 mass %. Its lower limit includes 0 mass %.

[Si]: Si is an element that may reduce the core loss. If its content is less than the lower limit of 0.1 mass %, core loss deteriorates. A more preferable lower limit is 1.0 mass % in a viewpoint of further reducing core loss. Its preferable lower limit is 0.3 mass %, more preferably 0.7 mass %, and further preferably 1.0 mass %. If its content exceeds the upper limit of 7.0 mass %, the workability remarkably becomes poor, so the upper limit is set to 7.0 mass %. Note that a preferable value as the upper limit is 4.0 mass % where cold-rolling property is better, a more preferable value is 3.0 mass %, and a further preferable value is 2.5 mass %.

[Al]: Al is an element that may reduce, similarly to Si, the core loss. If its content is less than 0.1 mass %, core loss property deteriorates, while if the content exceeds the upper limit of 3.0 mass %, the cost remarkably increases. The lower limit of Al is set, in terms of core loss, to preferably 0.2 mass %, more preferably 0.3 mass %, and further preferably 0.6 mass %.

[Mn]: To increase the hardness of the steel sheet and improve its punching property, 0.1 mass % or more of Mn is added. Note that the upper limit of 2.0 mass % is for an economical reason.

[S]: S forms a sulfide such as MnS or TiS to deteriorate the grain growth and core loss. In the present invention, S is scavenged as REM inclusions, but its upper limit for actual use is set to 0.005 mass %, and more preferably 0.003 mass %. Its lower limit includes 0 mass %.

[N]: N forms a nitride such as AlN or TiN to deteriorate core loss. In the present invention, N is scavenged as TiN by REM inclusions, but its upper limit for actual use is set to 0.005 mass %. The upper limit is, for the above-described reason, preferably 0.003 mass %, more preferably 0.0025 mass %, and further preferably 0.002 mass %. Further, the amount of N is preferably provided as small as possible for the aforementioned reason. However, there may be industrial constraint to bring its content to be as little as possible, e.g., close to 0 mass %, so the lower limit is set to greater than 0 mass %. Using the guide of the lower limit for actual use being 0.001 mass %, the content of N can be reduced to 0.0005 mass %, which is preferable because formation of nitride is suppressed, and the content reduced down to 0.0001 mass % can also be preferable.

[Ti]: Ti forms fine inclusions such as TiN or TiS to deteriorate the grain growth and core loss. In the present invention, Ti is scavenged as TiN by REM inclusions, but its upper limit for actual use is set to 0.02 mass %. Note that the upper limit is, for the above-described reason, preferably 0.01 mass %, and more preferably 0.005 mass %.

As described above, the lower limit is greater than 0 mass %. When Ti is deficient in amount, no scavenge effect is exerted on the REM inclusions. The Ti amount exceeding 0.0012 mass % is preferable because the scavenge effect is exerted on the REM inclusions, the Ti amount exceeding 0.0015 mass % is preferable because the scavenge effect is enforced, the Ti amount of 0.002 mass % or greater is more preferable, and the Ti amount of 0.0025 mass % or greater is further preferable.

[REM]: REM forms oxysulfide or sulfide to fix or immobilize S, thereby preventing or suppressing formation of fine sulfide. Further, REM serves as a site for composite precipitation of TiN to exert the Ti scavenge effect. When the content is less than the lower limit of 0.0003 mass %, the above-described effect is not sufficiently exerted, while when the content is greater than the upper limit of 0.05 mass %, grain growth is inhibited by the contained REM inclusions. Therefore, the appropriate range is set to not less than 0.0003 mass % nor more than 0.05 mass %.

Further, the above effect can be exerted even when only one kind or two or more kinds of elements are used as long as they are elements included in REM and their contents fall within the ranges of the present invention.

The effect of fixing S increases in proportion to the REM amount, and therefore the lower limit of REM can be preferably 0.001 mass % or greater, more preferably 0.002 mass % or greater, further preferably 0.0025 mass % or greater, and still further preferably 0.003 mass % or greater.

As described above, TiN is formed and grown on REM oxysulfide or REM sulfide, whereby Ti is scavenged. Accordingly, it is obvious that as the REM amount increases with respect to the Ti amount, the REM oxysulfide or REM sulfide as the TiN formation site increases more and the above effect is therefore enhanced.

The ratio of the REM amount to the Ti amount, e.g., the [REM]/[Ti] value exceeding 0.25 is enough for practical use, and if the [REM]/[Ti] value exceeds 0.5, the above effect is preferably enhanced, the [REM]/[Ti] value exceeding 1.0 is more preferable, and the [REM]/[Ti] value exceeding 1.25 is further preferable.

Elements other than the components described above may be contained, e.g., when they do not significantly interfere with the effect of the steel of the present invention and fall within the scope of the present invention.

Selectable element will be described below. Note that all of the lower limits of their contents are set to greater than 0 mass % because these elements are only required to be contained, even in a small amount.

[P]: P increases the strength of the material improving its workability although its content is preferably 0.1 mass % or less because excessive P deteriorates cold-rolling property.

[Cu]: Cu improves the corrosion resistance and increases the resistivity improving core loss although its content is preferably 0.5 mass % or less because excessive Cu impairs the surface quality due to occurrence of scab and the like on the surface of a product sheet.

[Ca] and [Mg]: Ca and Mg are desulfurizing elements and combines S in the steel to form sulfides fixing S. However, unlike REM, they are less effective for making composite precipitation with TiN. The desulfurization effect is enhanced when the adding amount is increased, but when the amount exceeds the upper limit of 0.05 mass %, excessive sulfide of Ca and Mg inhibit grain growth. Accordingly, the amount is preferably 0.05 mass % or less.

[Cr]: Cr improves the corrosion resistance and increases the resistivity improving core loss. However, excessive addition thereof leads to an increased cost, and therefore the upper limit is set to 20 mass %.

[Ni]: Ni fosters the formation of texture advantageous to a good magnetic property improving core loss although excessive addition thereof leads to an increased cost, and therefore the upper limit is set to 1.0 mass %.

[Sn] and [Sb]: Sn and Sb are segregation elements, hinder formation of texture on the (111) surface which deteriorates a magnetic property improving core loss. These elements exert the above-described effect either by use of only one of them or by use of two in combination. The upper limit is set to 0.3 mass % because the content exceeding 0.3 mass % deteriorates the cold-rolling property.

[Zr]: Zr, even in a small amount, hinders grain growth to deteriorate the core loss after stress relief annealing. Accordingly, Zr is preferably reduced as little as possible to be 0.01 mass % or less.

[V]: V forms nitride or carbide hindering magnetic domain wall motion and grain growth. Therefore, its content is preferably to 0.01 mass % or less.

[O]: When O greater than 0.005 mass % is contained, many oxides are precipitated hindering magnetic domain wall motion and grain growth. Accordingly, its content is preferably set to 0.005 mass % or less.

[B]: B is a grain boundary segregation element and forms nitride. The nitride hinders grain boundary migration to deteriorate core loss. Accordingly, its content is preferably reduced as much as possible to be 0.005 mass % or less.

In addition to the above elements, other known elements can be added and, for example, Bi and Ge can be used as the elements to improve a magnetic property and may be selected as required according to the desirable magnetic property.

Further, preferable manufacturing condition in an exemplary embodiment of the present invention and the reason for defining the condition are described. As an initial matter, in the steelmaking stage, it is preferable that in a refining operation in a converter and a secondary refining furnace by a conventional method, the total mass percentage of FeO and MnO in slag, referenced as an oxidation ratio, can be set to be within approximately 1.0% to 3.0%.

This may be because (i) when the oxidation ratio is less than 1.0%, it is difficult to effectively prevent the Ti contamination returned from slag (formation of metal Ti due to reduction). This is due to the activity of Ti increasing because of Si being within the Si content in electrical steel resulting in undesired Ti increase, and (ii) when the oxidation ratio is greater than 3.0%, REM in the molten steel is undesirably oxidized due to supply of oxygen from the slag failing to form REM oxysulfide or REM sulfide, resulting in insufficient fixation of S in the exemplary steel sheet.

Further, it may also be important to eliminate or reduce external oxidation sources as much as possible by carefully selecting a refractory for a furnace material. Furthermore, it is preferable to keep, e.g., ten minutes or more between REM addition and casting in order to ensure enough time to float up for the REM oxide which likely precipitates during the addition of REM. With the above-described measures, the exemplary steel which has a composition within the intended range can be manufactured.

After producing molten steel with a composition within the desired range by the aforementioned method, the cast steel such as a slab or the like may be cast by continuous casting or ingot casting.

During the casting, TiN can be precipitated on REM oxysulfide or REM sulfide making a complex. Thus, it can be important to avoid unnecessary high cooling rate in casting to ensure the time enough for the growth of TiN precipitation on them, and further to obtain the number density of inclusions having the size defined in the present invention. Indeed, it may be important to appropriately adjust the time for the cast steel to be kept within the temperature range of 1200° C. to 1300° C., that is, the starting temperature of precipitation of TiN. It is significant that although TiN is precipitated when the melt steel of a desired composition reaches the precipitation starting temperature of TiN from a higher temperature, the precipitation of TiN on the inclusions containing REM cannot grow sufficiently if the steel melt rapidly passes through the temperature range of 1200° C. to 1300° C., leading to insufficient scavenging. Once the scavenging is failed, Ti precipitates as inclusions such as TiS or TiC at a temperature lower than TiN and they become fine inclusions after re-melting and re-precipitation by the thermal treatment in the subsequent process. Accordingly, the temperature control when the steel passes through the aforementioned temperature range for the first time is important.

Although the optimal temperature pattern is variously different depending on the composition of a steel to be manufactured, the exemplary steel should be maintained at least for, e.g., one minute or more, preferably five minutes or more, and more preferably 20 minutes or more within the range of 1200° C. to 1300° C., the starting temperature of precipitation of TiN. For the method of measuring the temperature of the steel, a measurement such as using a radiation thermometer or a calculation analysis using heat transfer calculation can be applicable.

In the abovementioned Table 2, sample Nos. 11 and 12 are the steels which were allowed to pass through the temperature range of 1200° C. to 1300° C. for one minute or more and less than 20 minutes. Whereas in the process of the sample Nos. 13 and 14, the temperature patterns were adjusted such that the steels were gradually cooled for the periods of several times more than the aforementioned period, showing that the grain sizes and the core losses after stress relief annealing were further improved.

As a result of another evaluation of inclusions with a size of less than 50 nm, finer than the 100 nm used in the evaluation of the table, the number densities of inclusions with a size of less than 50 nm included in the product samples of Nos. 13 and 14 were $2.1 \times 10^9$ [/mm$^3$] and $2.3 \times 10^9$ [/mm$^3$], respectively, both of which were not greater than $2.5 \times 10^9$ [/mm$^3$]. In particular, with a longer period where the steel is kept within the temperature range of 1200° C. to 1300° C., the above-described effect of scavenging Ti can become more remarkable and the number density of fine inclusions with a size of less than 50 nm is reduced, leading to an improved product property.

The above-described period where the steel is maintained within the temperature range of 1200° C. to 1300° C. is an example, and in no way limiting.

There are various methods of adjusting the period keeping the cast steel within the range of 1200° C. to 1300° C. depending on the casting facilities. The adjustment can be performed using certain equipment for keeping the cast steel warm but can also be performed, even without such keep-warm equipment, for example through adjustment of flow rate of cooling water, or adjustment of casting size or casting speed.

Subsequently, the steel can be further subjected to hot rolling, hot band annealing as required, cold rolling in one or more steps with intermediate annealing there between to a product thickness, then finish annealing, and is coated with an insulative coating. Using the above-described method, the inclusions in the product sheet can be controlled to fall within the scope of the present invention.

EXEMPLARY EMBODIMENT OF THE PRESENT INVENTION

Certain steel sheets contain, by mass %, C: 0.0024%, Si: 2.1%, Mn: 0.2%, and S: 0.0025%, the elements shown in Table 2, and further contain P: 0.02% and Cu: 0.01%, were melted and refined to continuously cast slabs. The period during which the temperature of the slabs were lowered from 1300° C. to 1200° C. was adjusted to three minutes, and the slabs were then subjected to hot rolling, hot band annealing, and cold rolling to cold-rolled sheets with a thickness of 0.5 mm.

Subsequently, the sheets were subjected to finish annealing at 850° C. for 30 seconds and coated with an insulative coating to product sheets, and further subjected to stress relief annealing at 750° C. for 1.5 hours. Then, the evaluation for inclusion, grain size, and magnetic property evaluation of the product sheets by 25 cm Epstein's method were performed. The evaluation on inclusion was performed in the above-described manner. In evaluation of the grain size, a cross section of the sheet perpendicular to the thickness direction was polished into a mirror face and subjected to etching using nital to thereby allow grains to appear so that their size was measured to obtain their average grain size.

As provided in the above-described Table 2, the exemplary product sheets according to an exemplary embodiment of the present invention provided good results in grain growth and core loss. On the other hand, the product sheets out of the range of the preset invention presented results inferior in grain growth and core loss.

INDUSTRIAL APPLICABILITY

According to the present invention, the size and the number density of fine inclusions contained in a non-oriented electrical steel can be adjusted to fall within appropriate ranges, whereby a sufficiently excellent magnetic property may be obtained even by a simpler annealing. In particular, it becomes possible to obtain a sufficiently excellent magnetic property even by a simpler stress relief annealing, contributing to saving energy consumption while satisfying the needs of customers and users.

TABLE 1

| No. | Density of inclusions [×10$^{10}$/mm$^3$] | Density (a) of inclusions with diameters less than 50 nm [×10$^{10}$/mm$^3$] | Density (b) of inclusions with diameters less than 100 nm [×10$^{10}$/mm$^3$] | Density of inclusions with diameters 100 nm or more [×10$^{10}$/mm$^3$] | Recrystallized grain size after annealing [μm] | Core loss after annealing: W15/50 [W/kg] | Evaluation |
|---|---|---|---|---|---|---|---|
| 1 | 1.55 | 1.01 | 1.39 | 0.16 | 35 | 2.96 | X |
| 2 | 1.12 | 0.75 | 1.03 | 0.09 | 47 | 2.87 | X |
| 3 | 0.97 | 0.59 | 0.86 | 0.11 | 64 | 2.69 | ○ |
| 4 | 0.96 | 0.51 | 0.88 | 0.08 | 65 | 2.70 | ○ |
| 5 | 0.75 | 0.28 | 0.62 | 0.13 | 66 | 2.67 | ○ |
| 6 | 0.62 | 0.24 | 0.59 | 0.03 | 71 | 2.61 | ◎ |
| 7 | 0.50 | 0.20 | 0.31 | 0.19 | 71 | 2.60 | ◎ |

TABLE 2

| No. | Product composition (mass %) | | | | Value of evaluation equation (X) | Major inclusions with diameters of less than 100 nm in product | Amount of inclusions with diameter of less than 100 nm in product [×10$^{10}$/mm$^3$] | Major inclusions with diameters 100 nm or more in product (X·X) | Recrystallized grain size after annealing [μm] | Core loss after annealing W15/50 [W/kg] | Remarks |
| | Al | Ti | N | REM | | | | | | | |
|---|---|---|---|---|---|---|---|---|---|---|---|
| 11 | 0.32 | 0.0016 | 0.0019 | 0.0045 | 0.15 | MnS | 0.6 | REM-OS + TiN | 67 | 2.65 | within invention range |
| 12 | 0.30 | 0.0012 | 0.0024 | 0.0296 | 0.04 | Cu$_2$S | 0.5 | REM-OS + TiN | 68 | 2.64 | within invention range |
| 13 | 0.30 | 0.0020 | 0.0011 | 0.0013 | 0.33 | Cu$_2$S | 0.3 | REM-OS + TiN | 71 | 2.61 | within invention range |
| 14 | 0.31 | 0.0015 | 0.0008 | 0.0069 | 0.21 | Cu$_2$S | 0.4 | REM-OS + TiN | 69 | 2.62 | within invention range |
| 15 | 0.31 | 0.0228 | 0.0020 | 0.0072 | 1.32 | TiC | 2.5 | REM-OS + TiN | 35 | 3.06 | excessive Ti |
| 16 | 0.31 | 0.0012 | 0.0043 | 0.0051 | −0.03 | TiN | 1.8 | REM-OS, AlN | 38 | 2.83 | out of evaluation equation |
| 17 | 0.30 | 0.0011 | 0.0029 | 0.0051 | −0.01 | TiN | 1.7 | REM-OS, AlN | 39 | 2.81 | out of evaluation equation |

TABLE 2-continued

| No. | Product composition (mass %) | | | | Value of evaluation equation (✗) | Major inclusions with diameters of less than 100 nm in product | Amount of inclusions with diameter of less than 100 nm in product [×10¹⁰/mm³] | Major inclusions with diameters 100 nm or more in product (✗·✗) | Recrystallized grain size after annealing [μm] | Core loss after annealing W15/50 [W/kg] | Remarks |
|---|---|---|---|---|---|---|---|---|---|---|---|
| | Al | Ti | N | REM | | | | | | | |
| 18 | 0.30 | 0.0009 | 0.0022 | 0.0034 | −0.08 | TiN | 1.6 | REM-OS, AlN | 41 | 2.76 | out of evaluation equation |
| 19 | 0.32 | 0.0016 | 0.0024 | — | 0.13 | TiS | 2.9 | MnS, AlN | 33 | 3.11 | no REM |
| 20 | 0.32 | 0.0024 | 0.0021 | 0.0002 | 0.32 | TiS | 2.3 | REM-OS + TiN, MnS | 36 | 2.99 | deficient REM |

(✗) log([Ti] × [N]) − 1.19 × log([Al] × [N]) + 1.84
(✗·✗) REM-OS + TiN: REM oxysulfide + TiN composite

What is claimed is:

1. A non-oriented electrical steel sheet, comprising:
a particular number density of inclusions with an equivalent volume diameter of less than 100 nm contained in the steel sheet, the particular number density of inclusions being approximately at most $1 \times 10^{10}$ [/mm³];
and comprising, by mass %:
C: up to 0.01%,
Si: 0.1% to 7.0%,
Al: 0.1% to 3.0%,
Mn: 0.1% to 2.0%,
REM: 0.0003% to 0.05%,
Ti: up to 0.02%,
S: up to 0.005%,
N: up to 0.005%, and
a balance of Fe and inevitable impurities, and
wherein the mass % of Al, the mass % of N and the mass % of Ti satisfy the following equation:

$$\log([Ti] \times [N]) - 1.19 \times \log([Al] \times [N]) + 1.84 > 0.$$

2. A non-oriented electrical steel sheet, comprising:
a particular number density of inclusions with an equivalent volume diameter of less than 50 nm contained in the steel sheet, the particular number density of inclusions being approximately at most $2.5 \times 10^9$ [/mm³];
and comprising, by mass %:
C: up to 0.01%,
Si: 0.1% to 7.0%,
Al: 0.1% to 3.0%,
Mn: 0.1% to 2.0%,
REM: 0.0003% to 0.05%,
Ti: up to 0.02%,
S: up to 0.005%,
N: up to 0.005%, and
a balance of Fe and inevitable impurities, and
wherein the mass % of Al, the mass % of N and the mass % of Ti satisfy the following equation:

$$\log([Ti] \times [N]) - 1.19 \times \log([Al] \times [N]) + 1.84 > 0.$$

3. The non-oriented electrical steel sheet according to claim 1,
further comprising, by mass %:
at least one P: up to 0.1%,
Cu: up to 0.5%,
Ca or Mg: up to 0.05%,
Cr: up to 20%,
Ni: up to 1.0%,
at least one of Sn or Sb: up to 0.3%,
Zr: up to 0.01%,
V: up to 0.01%,
O: up to 0.005%, and
B: up to 0.005%.

4. The non-oriented electrical steel sheet according to claim 2,
further comprising, by mass %:
at least one P: up to 0.1%,
Cu: up to 0.5%,
Ca or Mg: up to 0.05%,
Cr: up to 20%,
Ni: up to 1.0%,
at least one of Sn or Sb: up to 0.3%,
Zr: up to 0.01%,
V: up to 0.01%,
O: up to 0.005%, and
B: up to 0.005%.

5. A method for manufacturing a non-oriented electrical steel sheet, comprising:
maintaining the steel sheet within a temperature range of 1200° C. to 1300° C. for approximately at least one minute, the steel sheet containing, by mass %:
C: up to 0.01%,
Si: 0.1% to 7.0%,
Al: 0.1% to 3.0%,
Mn: 0.1% to 2.0%,
REM: 0.0003% to 0.05%,
Ti: up to 0.02%,
S: up to 0.005%,
N: up to 0.005%, and
a balance of Fe and inevitable impurities, and
wherein the mass % of Al, the mass % of N and the mass % of Ti satisfy the following equation:

$$\log([Ti] \times [N]) - 1.19 \times \log([Al] \times [N]) + 1.84 > 0.$$

6. The method according to claim 5, wherein the steel sheet further comprises, by mass %,
at least one P: up to 0.1%,
Cu: up to 0.5%,
at least one of Ca or Mg: up to 0.05%,
Cr: up to 20%,
Ni: up to 1.0%,
at least one of Sn and Sb: up to 0.3%,
Zr: up to 0.01%,
V: up to 0.01%,
O: up to 0.005%, and
B: up to 0.005%.

* * * * *